United States Patent
Hepler et al.

(10) Patent No.: US 7,496,074 B2
(45) Date of Patent: Feb. 24, 2009

(54) SOFTWARE PARAMETERIZABLE CONTROL BLOCKS FOR USE IN PHYSICAL LAYER PROCESSING

(75) Inventors: Edward L. Hepler, Malvern, PA (US); Michael F. Starsinic, Philadelphia, PA (US); David S. Bass, Great Neck, NY (US); Binish Desai, Collegeville, PA (US); Alan M. Levi, Swarthmore, PA (US); George W. McClellan, Bensalem, PA (US); Douglas R. Castor, Norristown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 956 days.

(21) Appl. No.: 10/414,125

(22) Filed: Apr. 15, 2003

(65) Prior Publication Data

US 2004/0014447 A1 Jan. 22, 2004

Related U.S. Application Data

(60) Provisional application No. 60/372,763, filed on Apr. 15, 2002.

(51) Int. Cl.
*H04B 7/216* (2006.01)
(52) U.S. Cl. .................... 370/335; 370/344; 370/347
(58) Field of Classification Search ................ 370/335, 370/344, 347
See application file for complete search history.

(56) References Cited

U.S. PATENT DOCUMENTS

| | | | | |
|---|---|---|---|---|
| 5,850,393 A | * | 12/1998 | Adachi | ................. 370/335 |
| 5,987,010 A | | 11/1999 | Schnizlein | |
| 6,094,421 A | | 7/2000 | Scott | |
| 6,968,190 B1 | * | 11/2005 | Suumaki et al. | .............. 455/436 |
| 7,116,647 B2 | * | 10/2006 | Uebayashi et al. | ........... 370/329 |
| 2001/0006900 A1 | * | 7/2001 | Hanninen | ..................... 455/553 |
| 2001/0012283 A1 | * | 8/2001 | Miya et al. | ................... 370/342 |
| 2001/0034227 A1 | | 10/2001 | Subramanian et al. | |

FOREIGN PATENT DOCUMENTS

| | | |
|---|---|---|
| CN | 1260650 | 7/2000 |
| EP | 1 120 921 | 8/2000 |

(Continued)

OTHER PUBLICATIONS

Povey et al., "Hybrid TDD/TDD-CDMA for Third Generation Cellular Systems"; IEE Conference Proceedings; May 19, 1997; 2/1-2/6.

(Continued)

*Primary Examiner*—Brian D Nguyen
(74) *Attorney, Agent, or Firm*—Volpe and Koenig, P.C.

(57) ABSTRACT

A physical layer transport composite processing system used in a wireless communication system. A plurality of interconnected processing blocks are provided. The blocks are interconnected by a read data bus, a write data bus and a control bus. The blocks include a transport channel processing block, a composite channel processing block and a chip rate processing block. At least two of the blocks are capable of processing data for a plurality of wireless formats. A first set of parameters is programmed into the blocks for a particular wireless mode. The blocks are operated to process data in the particular wireless format mode.

29 Claims, 12 Drawing Sheets

FOREIGN PATENT DOCUMENTS

| | | |
|---|---|---|
| EP | 1120921 | 8/2000 |
| JP | 09-191276 | 7/1997 |
| JP | 9261761 | 10/1997 |
| JP | 2001-094490 | 4/2001 |
| JP | 2002-077103 | 3/2002 |

OTHER PUBLICATIONS

3GPP TS 25.223 V4.4.0 (Mar. 2002) 3rd Generation Partnership Project; Technical Specification Group Radio Access Network; Spreading and modulation (TDD) (Release 4).

3GPP TS 25.222 V4.3.0 (Mar. 2002) 3rd Generation Partnership Project; Technical Specification Group Radio Access Network; Multiplexing and channel coding (TDD) (Release 4).

3GPP TS 25.212 V4.4.0 (Mar. 2002) 3rd Generation Partnership Project; Technical Specification Group Radio Access Network; Multiplexing and channel coding (FDD) (Release 4).

3GPP TS 25.213 V4.2.0 (Dec. 2001) 3rd Generation Partnership Project; Technical Specification Group Radio Access Network; Spreading and modulation (FDD) (Release 4).

* cited by examiner

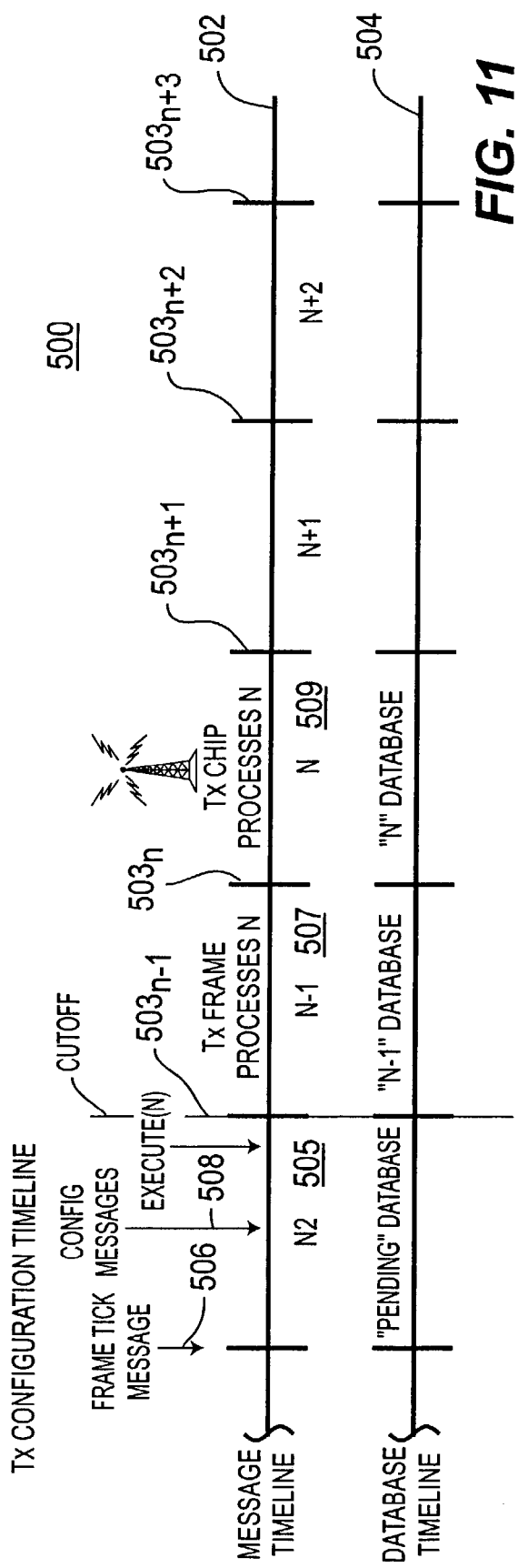
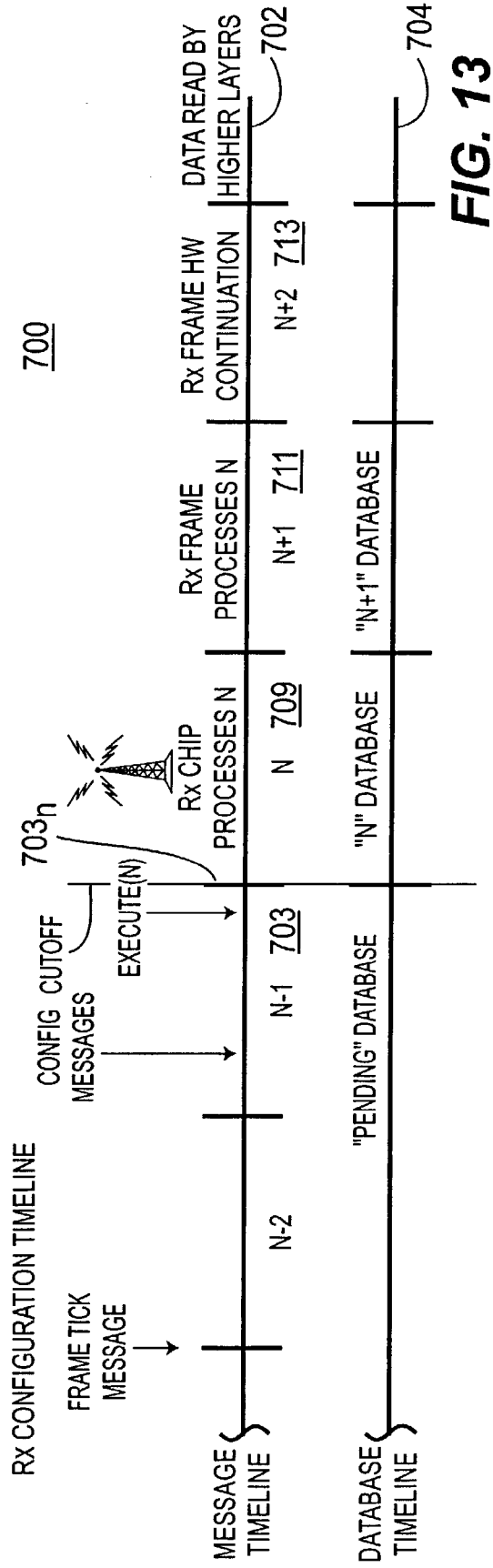
FIG. 11
FIG. 13

SOFTWARE PARAMETERIZABLE CONTROL BLOCKS FOR USE IN PHYSICAL LAYER PROCESSING

BACKGROUND OF THE INVENTION

The invention generally relates to wireless communication systems. In particular, the invention relates to processing data at the physical layer for such systems.

In wireless communication systems, data received from the network is formatted for transfer over the wireless interface. Conversely, data received over the wireless interface is processed to recover the original network data. The processing of this data is referred to as physical layer processing.

Processing data at the physical layer is a complex operation in wireless communication systems. FIG. 1 is a conceptual illustration of physical layer processing for the proposed time division duplex (TDD) mode for wideband code division multiple access (W-CDMA) of the proposed third generation partnership project (3GPP). The processing is shown for the transmitter. In an analogous reverse manner, the data is processed at the receiver. However, one difference with physical layer processing at the receiver is that the receiver typically processes soft symbols complicating the processing requirements. FIG. 1 also pertains conceptually to the uplink of the frequency division duplex (FDD) mode of W-CDMA. However, the parameters used by each block differ between TDD and FDD.

Transport blocks arrive for transport over the wireless interface. The transport blocks arrive in sets of transport block sets. The sets are received in a specified time interval, known as transmission time interval (TTI). For the TDD mode, and FDD mode the possible TTI lengths are 10 ms, 20 ms, 40 ms and 80 ms, which correspond to 1, 2, 4 and 8 radio frames, respectively. A circular redundancy code (CRC) attachment block 42 attaches CRC bits to each transport block. The CRC bits are used for error detection at the receiver. The CRC bit length is signaled from higher layers.

The transport blocks (TrBlks) are serially concatenated by the TrBlk concatenation/code block segmentation block 44. If the number of bits of the concatenated blocks is larger than the maximum size allowed for a code block, the concatenated blocks are segmented. A channel coding block 46 error correction encodes the code blocks, such as by convolutional coding, turbo coding. After encoding, the code blocks are concatenated together. If the concatenated code blocks can not be segmented into a minimum number of equal sized segments (frames), radio frame equalization is performed by concatenating additional arbitrary bits by a radio frame segmentation block 50.

A first interleaver 48 interleaves all the concatenated data. Subsequently, the interleaved data is segmented into radio frames by a radio frame segmentation block 50. A rate matching block 52 punctures or repeats bits. The puncturing and repeating assures data transmitted on each physical channel equals the maximum bit rate for that channel. The rate matching attributes for each transport channel (TrCH) is signaled by higher layers.

The TrCH multiplexing block 54A receives one frame's data for each transport channel. The received data for each TrCH is serially multiplexed onto a coded composite transport channel (CCTrCH). A bit scrambling block 55 scrambles the CCTrCH bits.

A physical channel segmentation block 58 maps the multiplexed data onto the physical channels. A second interleaver 60 interleaves the scramble data either over the entire radio frame or over each time slot. After second interleaving, the interleaved data is segmented into the physical channels for transport over the air interface by a physical channel mapping block 62.

The data for each physical channel is spread using a respective code by a spreading block 64. The spread data is scrambled using a scrambling block 66 with a code associated with the base station. Each resulting scrambled chip is pulse shaped by a pulse shape filter 68. A frequency correction block 70 adjusts the frequency of the resulting signal. The frequency corrected signal is radiated through the wireless interface.

For the downlink of FDD mode as also shown in FIG. 1, the processing is performed in a similar manner conceptually. However, there are some differences. In the FDD downlink, rate matching is performed after the channel coding by a rate matching block 52. As a result, radio frame equalization is not performed. To support discontinuous transmission, a first discontinuous transmission (DTX) indication is inserted prior to first interleaving by a first DTX indication block 72 and a second DTX indication is inserted prior to physical channel mapping by a second DTX indication block 74.

Two approaches for performing physical layer processing are a software based approach and a hardware based approach. In a software based approach, the bulk of the physical layer processing is performed by software. A software based approach allows for great flexibility. Parameters of the physical layer processing can be easily changed by software revisions.

Two drawbacks with a software based approach are that: 1) processors, such as microprocessors or DSPs use higher power than customized solutions, and 2) several processors may be needed to carry out all the required functionality.

A hardware based solution allows for a reduction in total chip area required and reduced power consumption. Customizing and configuring the hardware for a particular environment, the n better efficiencies in the data processing. However, such an approach reduces the flexibility of the design. Reconfiguration of the physical layer processing is limited to parameters made available in the initial design.

Accordingly, it is desirable to have a physical layer processing which allows for high processing speed and flexibility.

SUMMARY

A physical layer transport composite processing system used in a wireless communication system. A plurality of interconnected processing blocks are provided. The blocks are interconnected by a read data bus, a write data bus and a control bus. The blocks include a transport channel processing block, a composite channel processing block and a chip rate processing block. At least two of the blocks are capable of processing data for a plurality of wireless formats. A first set of parameters is programmed into the blocks for a particular wireless mode. The blocks are operated to process data in the particular wireless format mode.

BRIEF DESCRIPTION OF THE DRAWING(S)

FIG. 11 is a timing diagram of the transmit configuration timeline.

FIG. 13 is a timing diagram of the receive configuration timeline.

DETAILED DESCRIPTION OF THE PREFERRED EMBODIMENT(S)

Figure 1:
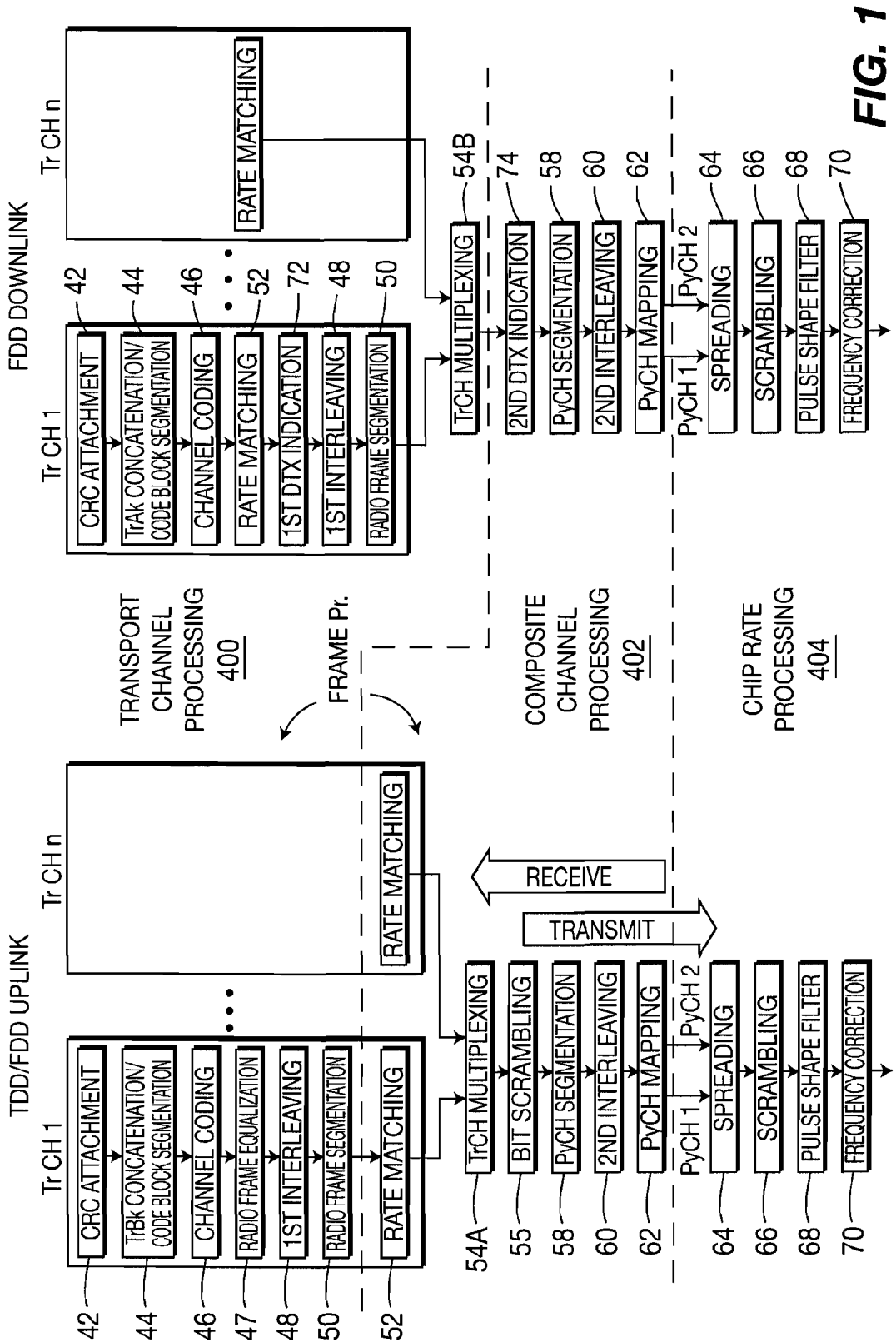
FIG. 1 is a conceptual illustration of physical layer processing for the standard time division duplex (TDD) and frequency division duplex (FDD) modes for wideband code division multiple access (W-CDMA) of the third generation partnership project (3GPP).

The present invention will be described with reference to the drawing figures wherein like numerals represent like elements throughout. Although the physical layer processing is primarily described in conjunction with the preferred implementation of the TDD and FDD modes of 3GPP, the physical layer processing is applicable to other systems, such as time division synchronous code division multiple access (TD-SCDMA), TSM, CDMA 2000 as well as others.

Figure 2:
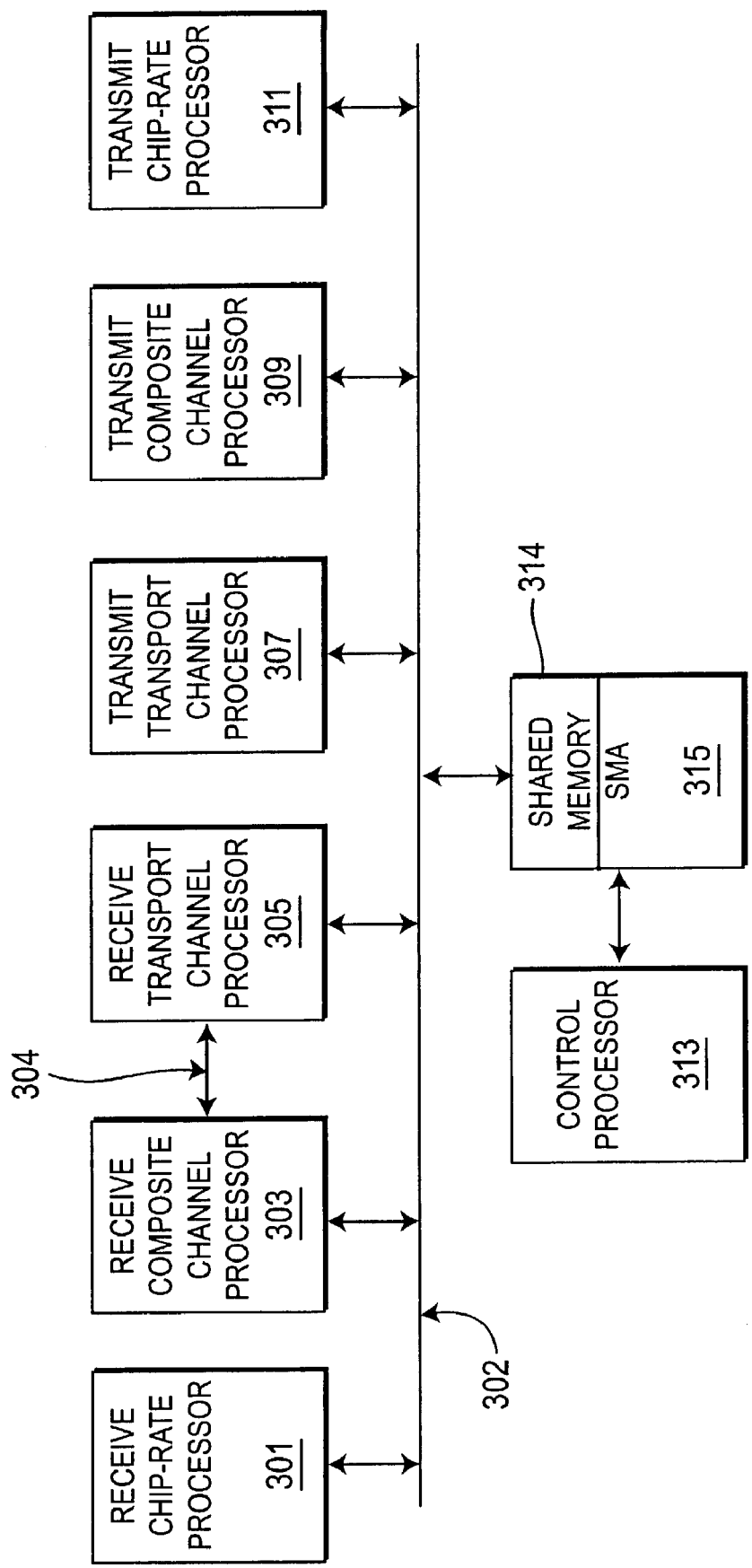
FIG. 2 is a simplified diagram of a physical layer processor.
Figure 3:
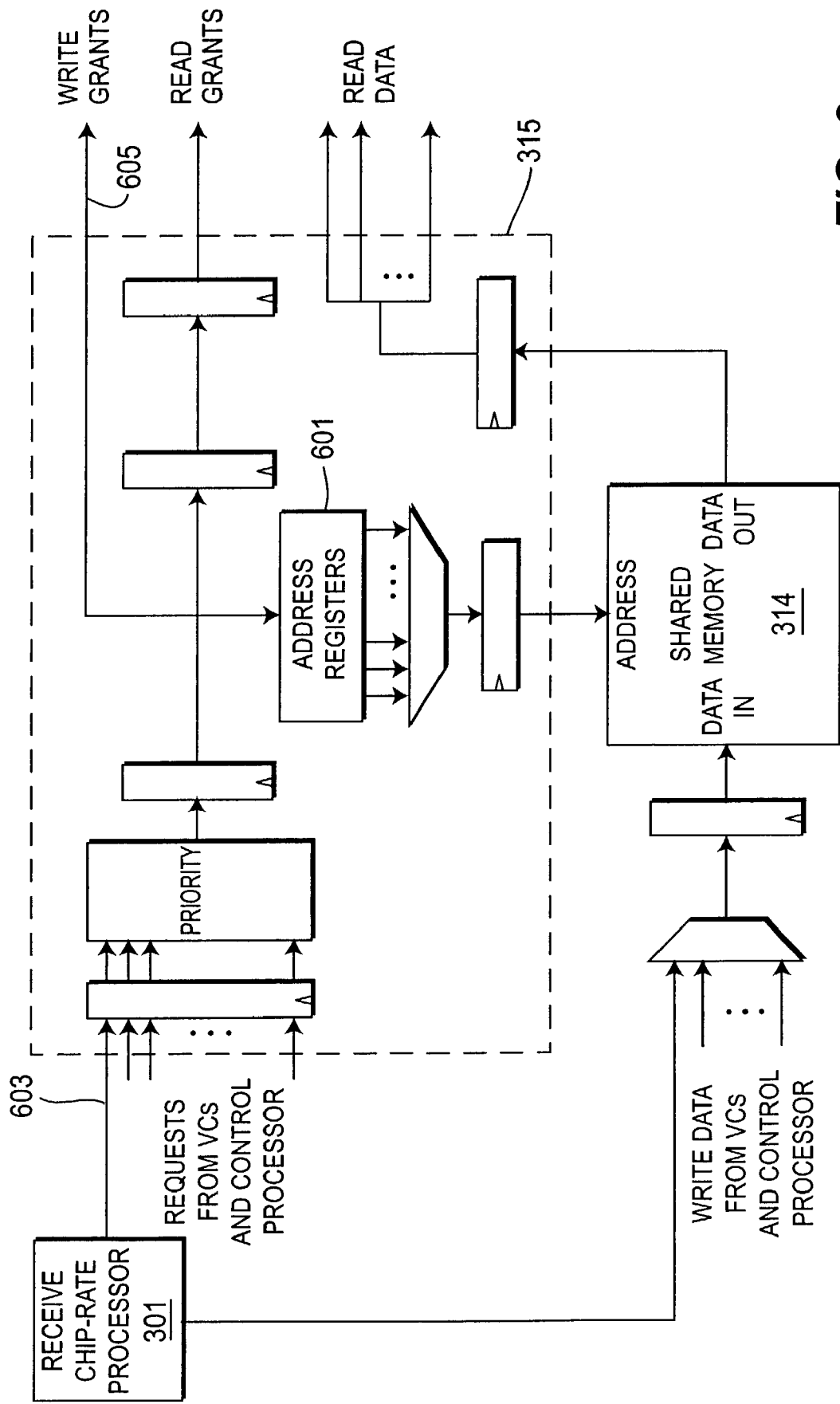
FIG. 3 is a high level block diagram of the shared memory arbitrator (SMA).

An overview of the preferred physical layer system architecture 300 is illustrated in FIG. 2. The physical layer system can be used at either a base station/Node-B of a wireless communication system or at a user equipment. The preferred architecture allows for flexibility in design of the physical layer processing across differing wireless environments, such as TDD, FDD modes of the proposed 3GPP W-CDMA system and GSM.

Blocks 301, 303, 305, 307, 309 and 311 represent a suite of software parametizable leveraged embedded processors and are also known as virtual circuits (VCs). A receive chip-rate processor 301 is connected to a data read bus, a data write bus and a control bus, hereinafter the three are to be known as the system bus 302. The receive composite channel processor 303 block and receive transport channel processor 305 block are also connected to the system bus 302. In addition, the two blocks also have a sequential number bus that reports to the receive transport channel processor 305 which data block is ready for transport channel processing. The transmit transport channel processor 307, transmit composite channel processor 309 and transmit chip-rate processor 311 blocks are also connected to the system bus 302. The shared memory/shared memory arbiter (SMA) 315 block is connected to the system bus 302 and to the control processor 313 block. In the preferred implementation, the block's functionality is designed to perform the physical layer processing of either TDD, FDD or both modes of the 3GPP, although in other implementations other physical layer processing approaches may be performed by the blocks.

The control processor 313 communicates with processing blocks via control queues in the shared memory 314 via the SMA 315. The control processor 313 places set-up and control data into specific shared memory locations to act as data registers for each control block. The shared memory is also utilized as a data block place holder to transfer data amongst the processing blocks. This is preferably achieved through linked lists which transfers data in blocks, with the last element of each block being an address of a next data block or an end of data indicator. This technique reduces buffering in the physical layer processor. The control processor 313 is preferably an advance RISC machine (ARM) processor. Alternately, it may be any embedded processor.

The Shared Memory Arbiter (SMA) 315 is a hardware only virtual circuit (VC) that controls access to a memory shared by the main VCs and the control processor 313. The SMA unit contains address registers and the sequencing logic necessary to allow all of the VCs and the processors to efficiently share access to the memory.

Figure 12:
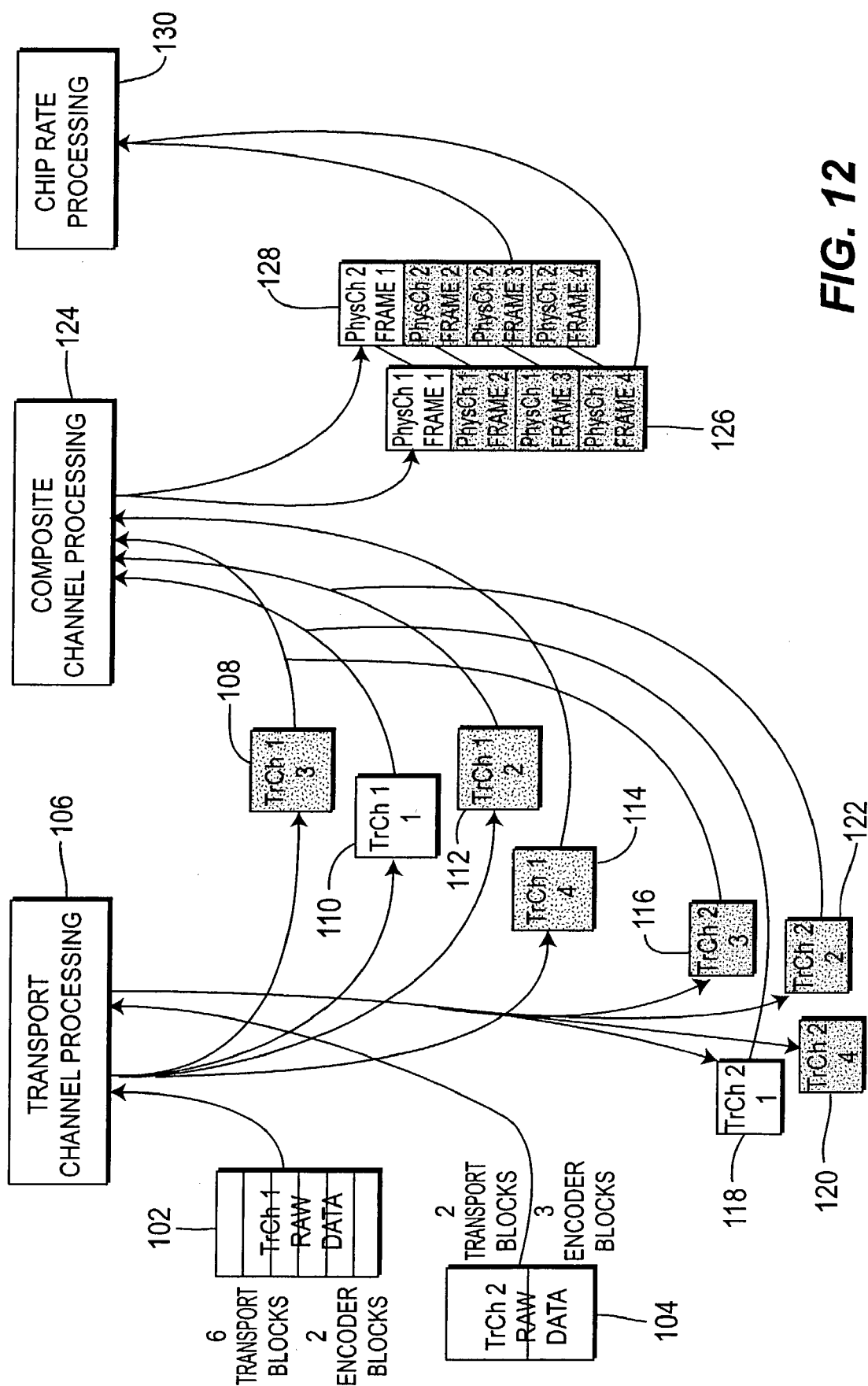
FIG. 12 is an illustration of data flow between transmit channel processing, composite channel processing and chip rate processing.

A high level block diagram of a SMA is illustrated by FIG. 12. The SMA unit contains address registers 601 and the sequencing logic necessary to allow all of the VCs and the processors to efficiently share access to the shared memory 314. The SMA accepts one request into its pipeline every clock cycle, provided there are pending request(s). The SMA address generator maintains a register for each SMA channel containing the address for the next memory access to be performed on that channel. These registers must be initialized to the first memory address of the memory block to be accessed. Each address register has an associated control bit that is configured by software to indicate if an address pointer is to be incremented or decremented after each access.

There are three types of memory channels: 1) read channel data is transferred from shared memory to the requesting unit, 2) write channel data is transferred from the requesting unit to the shared memory, and 3) control channels (special read channels) support two types of memory access, read access, as for a normal read channel and load access. Load access is used to transfer a memory pointer from shared memory into one of the address registers in the SMA. This allows an efficient implementation of a linked list.

Each hardware component is assigned one or more SMA channels, and transfers to and from memory are controlled by a request/grant handshake on each SMA channel. Request signals are prioritized in order to guarantee timely access on critical paths. Once a request is in the pipeline, the same request will not be accepted into the pipeline again, until the grant is sent.

When a receive chip rate processor 301 has completed its processing, it will send a request 603 to the SMA. The SMA 315 will prioritize the request 603 and allocate a memory address via the address register 601 for the shared memory 314. The SMA will then send a write grant 605 to the requesting source, to begin data transfer.

One potential implementation for the physical layer processing system is to process either or both the TDD and FDD modes of a 3GPP system. In such an implementation, referring back to FIG. 1, the various processing blocks are divided into three general processes, transport channel processing 400, composite channel processing 402 and chip rate processing 404. Transport channel processing 400 is performed on the transport channels. Composite channel processing 402 is performed on the composite channels and is performed on a frame by frame basis and chip rate processing 404 is also performed on a timeslot by timeslot basis.

As shown in FIG. 1 for TDD and FDD uplink processing, the transport channel processing performs the functions of CRC attachment 42, transport block concatenation 44, channel coding 46, radio frame equalization 47, first interleaving 48 and radio frame segmentation 50.

For the FDD downlink, the transport channel processing 400 includes the functions of CRC attachment 42, transport block concatenation 44, channel coding 46, rate matching 52, first DTX indication insertion 72, first interleaving 48, radio frame segmentation 50 and transport channel multiplexing 54B. It should be noted that in TDD mode, the de-rate matching 52 may be performed in either the transport or composite processor.

For the TDD mode and the FDD uplink, the composite channel processing 402 performs the functions of rate matching 52, transport channel multiplexing 54A, physical channel segmentation 58, bit scrambling 55, second interleaving 60 and physical channel mapping 62. For the FDD downlink, the composite channel processing 402 performs the functions of second DTX indication insertion 74, physical channel segmentation 58, second interleaving 60 and physical channel mapping 62. For the TDD mode and both the uplink and downlink of FDD mode, the chip rate processing 404 performs the functions of spreading 64, scrambling 66, pulse shape filtering 68 and frequency correction 70.

As shown in FIG. 1, preferably TDD and FDD processing 400, 403 is handled by three sections: 1) a transport channel processing 401 section, 2) a composite channel processing 402 section, and 3) a chip rate processing 403 section.

In the preferred architecture as shown in FIG. 2, control blocks are created for each of these sections for the transmit and receive operations, totaling six processing blocks (three transmit and three receive). The operations of these controls blocks is parametized. As a result, the manner at which these blocks operate can be changed by software. This allows for the same hardware control blocks to be used in differing wireless environments. Software is used to reparameterize the control blocks based on the wireless system it resides.

Figure 4:
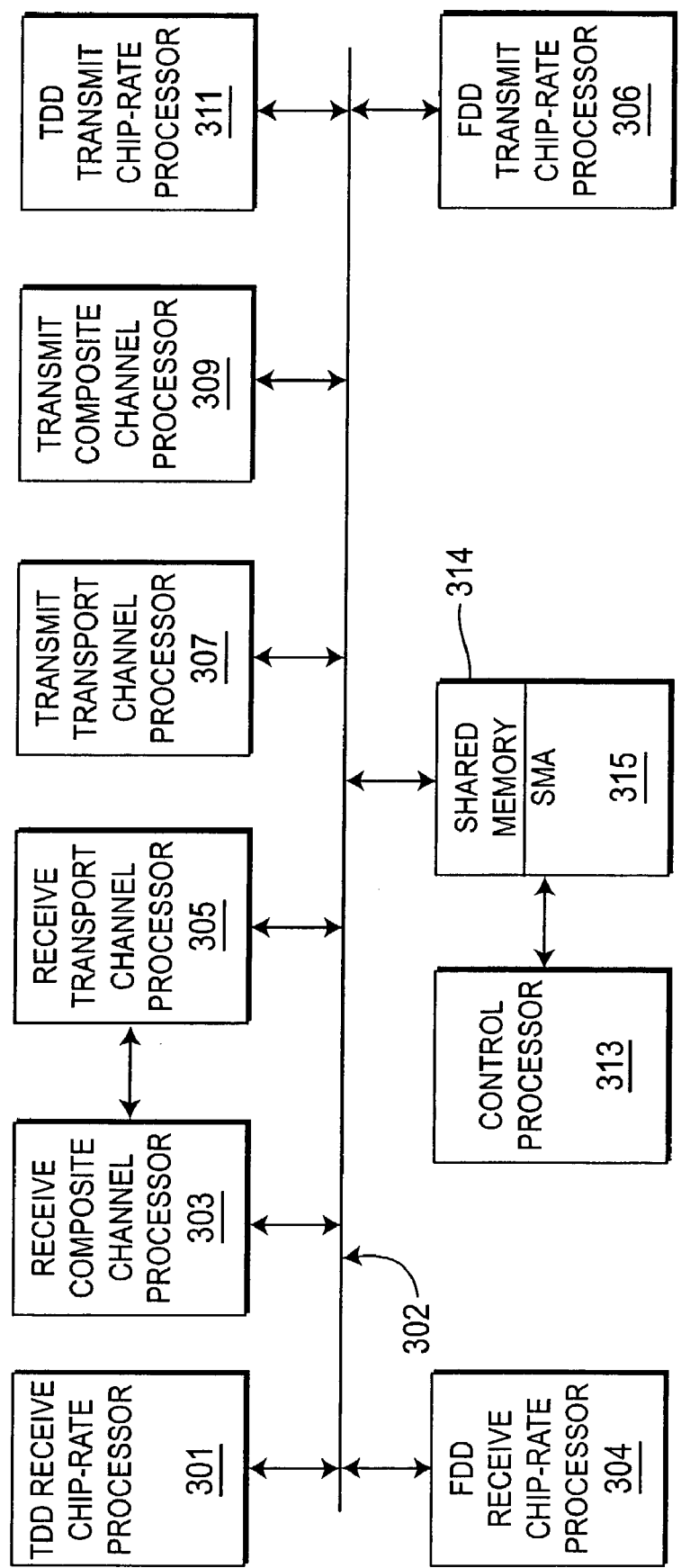
FIG. 4 is a simplified diagram of a physical layer processor capable of functioning in FDD and TDD modes.

An illustration of the flexibility of the control blocks is shown in FIG. 4, the physical layer processor capable of processing in both 3GPP FDD and TDD modes. The receive composite channel processor 303, receive transport channel processor 305, transmit transport channel processor 307, transmit composite channel processor 309, the control processor 313 (such as a ARM, DSP or RISC processor) and shared memory/SMA 315 are all utilized whether the physical layer processor is operating in TDD or FDD mode. However, the functions of each of these blocks are changed depending on the physical layer processor operating mode. Therefore depending whether the mode of operation is TDD, FDD or TSM, new reparameters are sent to the blocks allowing mode change.

Since the transmission formats in TDD and FDD differ, the physical layer processor has two transmit blocks, a TDD transmit chip-rate processor 311 and an FDD transmit chip-rate processor 306. Similarly, on the receive side, two receiver blocks are used, a TDD chip-rate processor 301 and a FDD receive chip-rate processor 304. The TDD chip rate processor 301 detects TDD formatted signals, such as by using a multi-user detection device. The FDD chip rate processor 304 detects FDD formatted signals, such as by using a Rake receiver.

When the physical layer processor is operating in TDD mode, the TDD receive chip-rate processor 301 and the TDD transmit chip-rate processor 311 are utilized along with the other six commonly utilized components. When the physical layer processor is operating in FDD mode, the FDD receive chip-rate processor 304 and the FDD transmit chip-rate processor 306 are utilized along with the other six commonly utilized components.

Since the only hardware difference required between the TDD and FDD modes is the chip-rate receivers 301, 304 and transmitters 311, 306, by using substantially the same hardware blocks either an FDD, TDD or both FDD/TDD physical layer processor can be implemented. In an analogous manner, these hardware blocks could be utilized for wireless systems other than the TDD and FDD modes of the 3GPP.

To implement a physical layer processor performing only TDD mode, the hardware blocks of FIG. 4 can be used without the FDD receive and transmit chip rate processors 304, 306. Conversely, to implement a physical layer processor performing only FDD mode, the hardware blocks of FIG. 4 can be used without the TDD receive and transmit chip rate processors 301, 311. As a result, the receive composite channel processor 303, receive transport channel processor 305, transmit transport channel processor and transmit composite channel processor 307 hardware implementations can be used in various wireless environments.

FIG. 4 is an illustration of the hardware components for either a preferred FDD mode user equipment (UE) or base station/Node-B. It should be noted that the cell search 316 is only for UEs. Signals are received over an antenna 317 or an antenna array of the user equipment/Node-B. An RF receiver 316 produces in-phase and quadrature baseband samples of the received signals.

The FDD receive chip-rate processor 301 comprises a cell search and Rake finger locator 316, Rake fingers 312 and data estimator 314. The cell search and Rake finger locator 316 performs cell selection and locates the paths of received communications to identify the phase delays for the Rake fingers 312. The Rake fingers 312 collects the energy of the multiple paths of the received signals. The data estimation 314 produces soft symbols of the received signals for composite processing.

The receive composite channel processor 303 performs the composite processing on the soft symbols produced by the data estimation 314. The receive transport channel processor 307 comprises a de-interleaver/de-rate matcher 52, a turbo decoder 41, a Viterbi decoder 43 and a CRC decoder 42. The de-interleaver/de-rate matcher performs an inverse of the first and second interleaving as well as an inverse of the rate matching. The turbo decoder 41 decodes turbo encoded signals and the Viterbi decoder decodes convolutionally encoded signals 43. The CRC decoder 42 decodes the CRCs of the received signals. Under the direction of the control processor 313 and SMA 315 control 316, the network data is recovered from the received signals using the FDD receive chip rate processor 301, the receive composite channel processor 303 and transport channel processor 305.

On the transmit side, the network data is processed by a transmit transport channel processor 307, transmit composite channel processor 309 and FDD transmit chip rate processor 311 to produce an in-phase and quadrature signal. The transmit transport channel processor 307, transmit composite channel processor 309 and FDD transmit chip rate processor 311 are directed by the control processor 313 and MEM/SMA controller 316 to perform the proper processing. The in-phase and quadrature signals are converted to a modulated RF signal by a RF modulator 308 and radiated by an antenna 317A or antenna array through the wireless interface.

Figure 6:
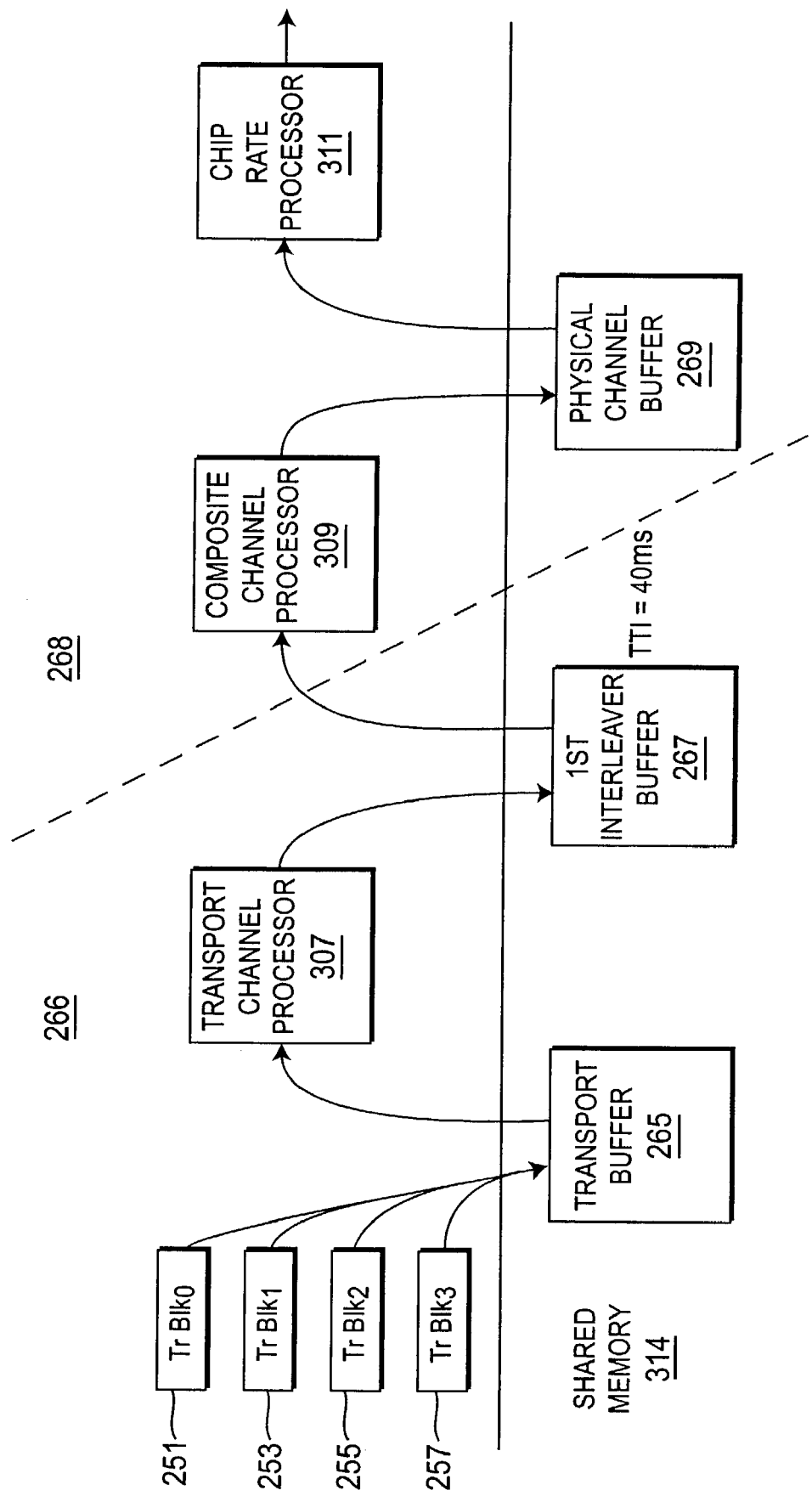
FIG. 6 illustrates how data is moved from shared memory to transmit processors.
Figure 7:
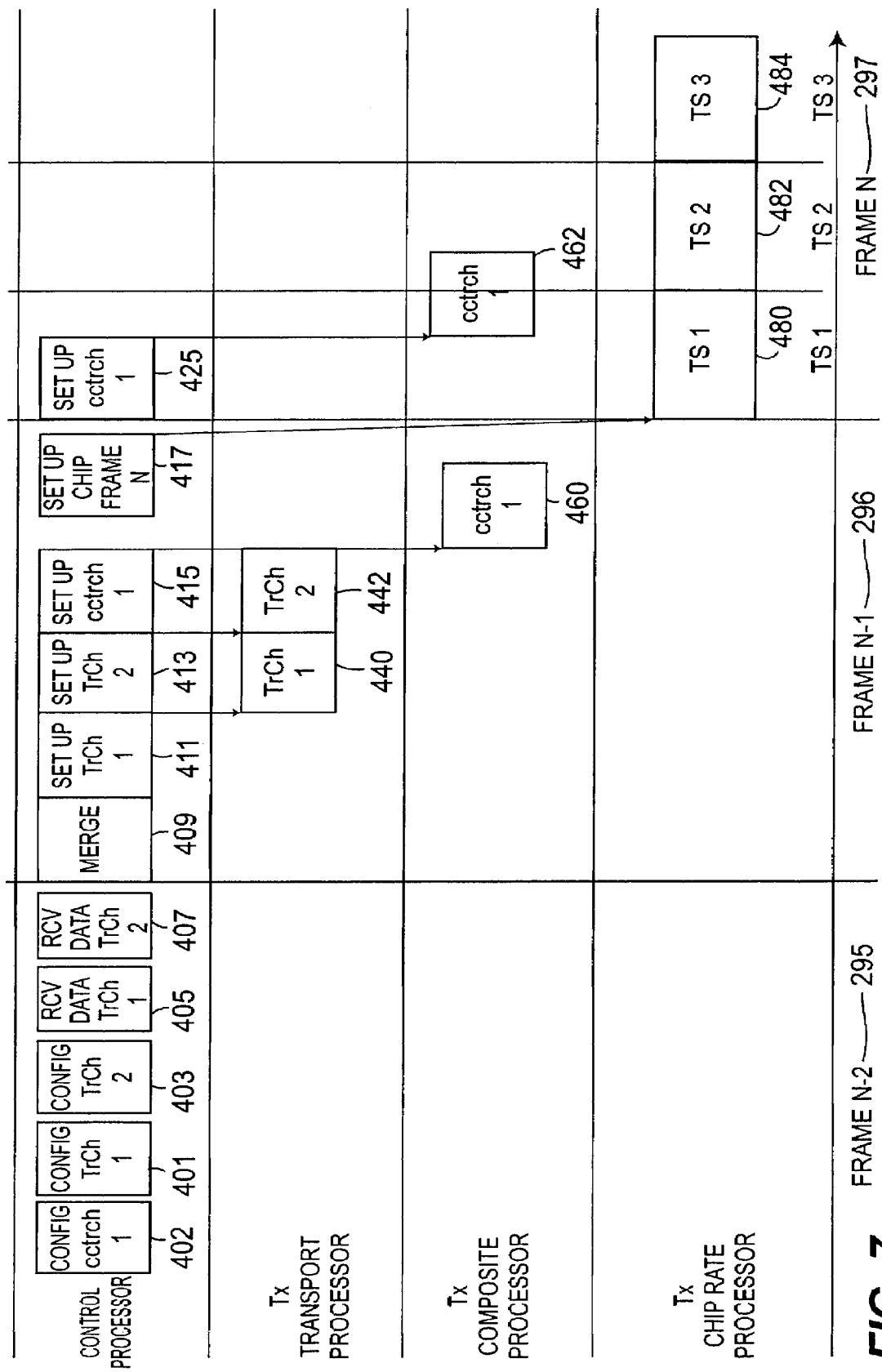
FIG. 7 is a timeline illustrating the 10 millisecond time interval configuration limit.

FIG. 6 illustrates how data is transferred between the shared memory 314 and the composite blocks for transmission. For reception, the process is performed in the reverse. For example, if the time transmission interval (TTI) is set to 4, there are four transmit blocks TrBlk0-TrBlk3 251-257 of data to be processed. The SMA 315 places the memory into the transmit buffer 265 of the shared memory 314. At each frame time, which is 10 ms, the SMA 315 transfers the blocks of data to the transport channel processor 307, where processing such as CRC attachment and channel coding occurs. When processing is complete or just about finished, the SMA 315 moves the processed data blocks into a first interleaver buffer 267 within the shared memory 314. Since the TTI is set to 40 ms In this example, the SMA 315 transfers one-quarter of the interleaver buffer 267 each 10 ms. (one frame) to the composite channel processor 309. After processing is complete or just about compled, the SMA 315 places the results into a physical channel buffer 269 in the shared memory 314. The frame's worth of data is then transferred into the chip rate processor 311 via the SMA 315. The processed data is sent to an RF modulator to be radiated through a wireless interface FIG. 7 illustrates the pipeline timing for the above transmit processing with frames of ten milliseconds in length, as per 3GPP. Two transport channels and an associated coded composite channel are configured in frame N−2 295 and data is immediately sent on the channels. The transmit frame components process data in frame N−1 296 and the transmit chiprate processing operates in frame N 297, the first over-the-air (OTA) frame for coded composite transport channel_1 (CCTrCh_1). Each horizontal region represents a computational component in the system and is a stage in the pipeline. The activity of each processor is represented by boxes 401-482, respectively. The activity boxes in each horizontal region appear in the order in which they will typically occur in the system. The dotted lines with arrows represent time dependencies. For example, when one processor ends a processing task, it communicates to another processor so that the latter may begin its processing task.

At time N−2 295, the configure transport channel 1 message is received by transmit frame software 401. In addition the configure CCTrCh channel 1 402, configure transport channel 2 403 messages are received by transmit frame software. The transmit data for transport channel 1 406 and transmit data for transport channel_2 407 are received by transmit frame software.

At time N−1 296, the new configurations are merged into active database 409. The transmit frame software writes a control block for transport channel 1 to shared memory and then tells transmit transport processor to begin processing 411. The transmit frame software writes control block for transport channel 2 to shared memory, then either links the new control block to the one for transport channel 1 or tells transmit transport processor to begin processing 413. The transmit frame software writes transmit composite control blocks for CCTrCh 1 to shared memory and tells transmit Composite processor to begin processing 415. The Transmit chip software writes control block for time slot 1 of frame N to shared memory.

At time N 297, the transmit chip software writes control block for time slot 2 of frame N to shared memory 419. The transmit frame software begins to write transmit Composite control blocks for cctrch 1 to shared memory and tells transmit Composite processor to begin processing 421. The transmit chip software interrupts transmit Frame software and writes control block for time slot 2 of frame N to shared memory 423. The transmit frame software completes writing Transmit composite control blocks for cctrch 1 to shared memory and tells transmit composite processor to begin processing 425.

The transmit transport reads transport data for transport channel 1 and outputs four frames of interleaved data to shared memory 440. The transmit transport reads control block and transport data from shared memory for transport channel 2 and outputs four frames of interleaved data to shared memory 442.

The transmit composite processor reads control blocks, 1st frame of transport channel 1's output data, and 1st frame of transport channel 2's output data. It processes the data and writes resource unit data into shared memory. The transmit composite processor must wait until the transmit transport processor has completed writing interleaved data for both transport channel 1 and transport channel 2 460. The transmit composite processor reads control blocks, 2nd frame of transport channel 1's output data, and 2nd frame of transport channel 2's output data. It processes the data and writes resource unit data into shared memory 462.

The chip rate processor reads resource unit data for the first timeslot of the first OTA frame of cctrch 1 and outputs soft symbols 480. The transmit chip rate processor reads resource unit data for the second timeslot of the first OTA frame of cctrch 1 and outputs soft symbols. This is followed by the transmit chip rate processor reading resource unit data for the third timeslot of the first OTA frame of cctrch 1 and outputs soft symbols 482.

Figure 8:
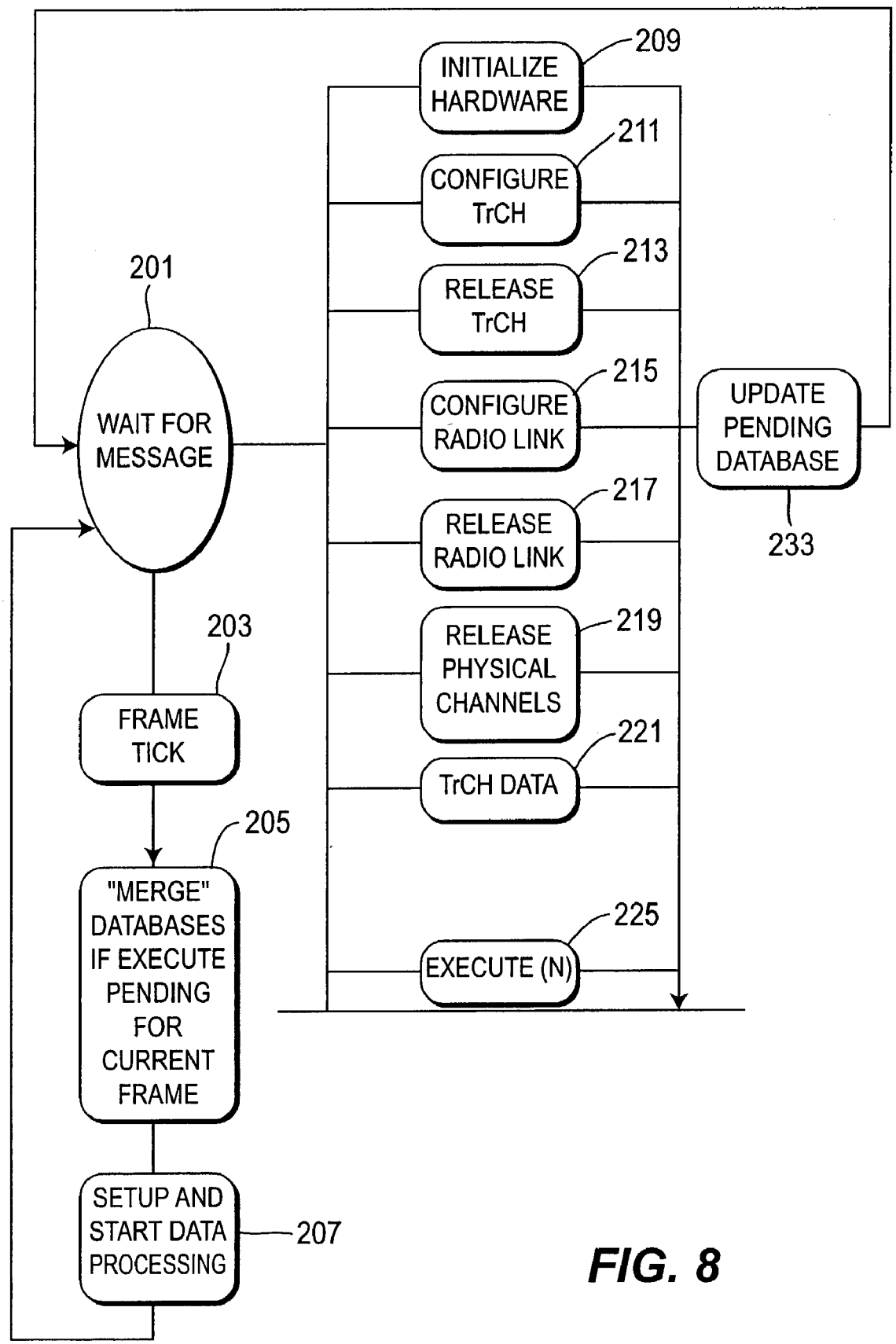
FIG. 8 is a state diagram of the transmit frame software structure.
Figure 9:
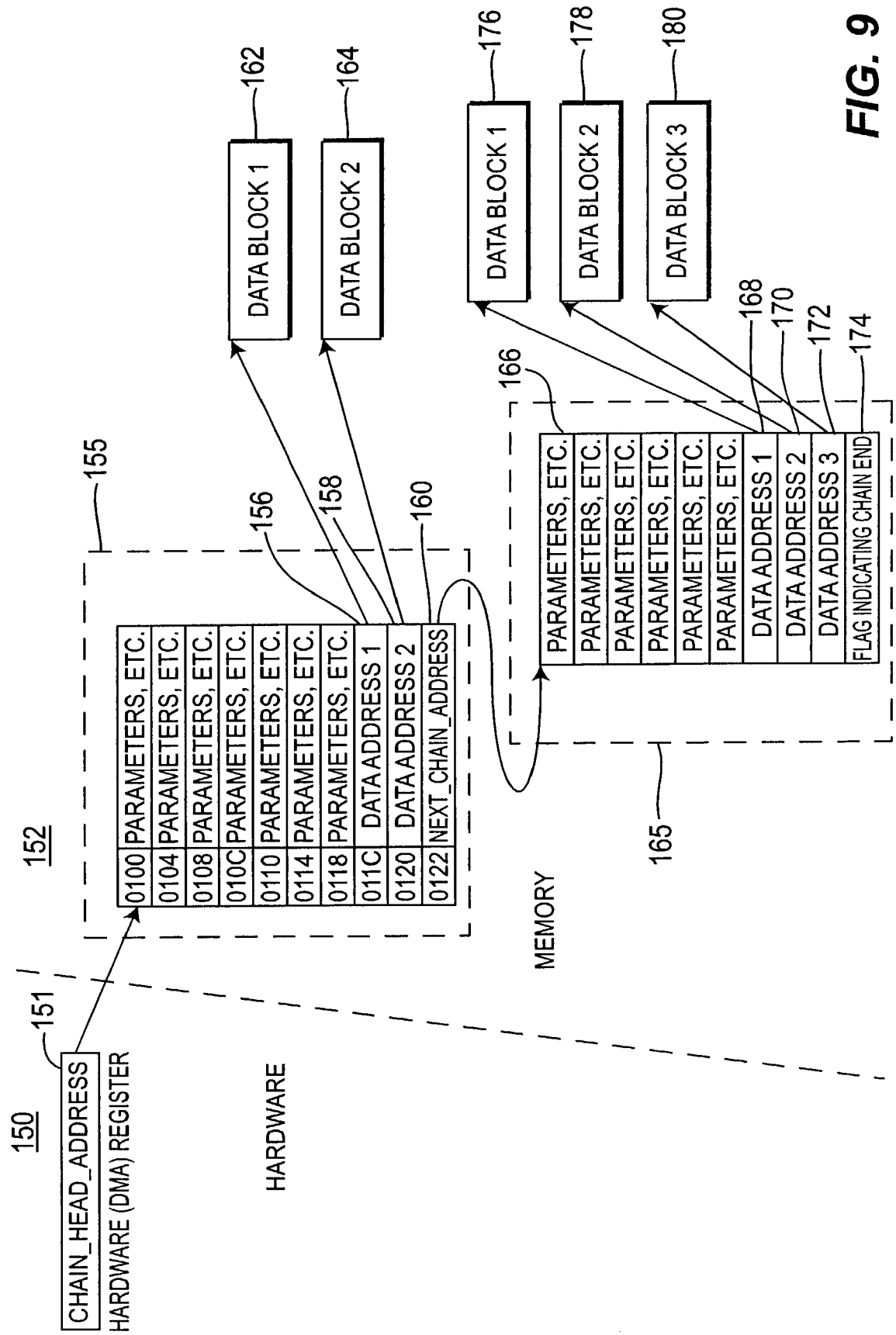
FIG. 9 is a diagram of a shared memory arbiter (SMA) hardware register and a pseudo memory map of typical control blocks.

The preferred software design is for the transmit frame to be a message based, event driven system, as shown in the top level state diagram in FIG. 8, with the system starting in wait for message loop 201. An arriving configuration messages cause a state change in the wait for message loop 201, bringing about a call to a service routine which places or updates data in a database. For example, the system requires a hardware initialization, the state change is detected in wait for message loop 201 and a call to initialize hardware 209 is performed. Upon return form the call, the update pending database 233 function is called and the hardware configuration data transfer to the pertinent database is carried out. When all configuration changes and data transfers are carried out, the wait for message loop 201 calls the execute(N) 225 function. This function causes a database register which holds information regarding what database have been updated or changed since the last frame tick 203.

A frame tick occurs every 10 ms. in this 3GPP example and is detected by the wait for message loop 201. The system goes into a frame tick 203 subroutine. The databases that are semaphored in the database register from the above execute(n) 225 function are updated 205 and a setup and start of the data processing 207 is performed.

The additional states of configure TrCh 209, release TrCh 211, configure radio link 215, release radio link 217, release physical channels 219 are examples of other routines the message loop 201 look for. The TrCh Data 221 routine is the subroutine that sets up the block transfers.

Figure 5:
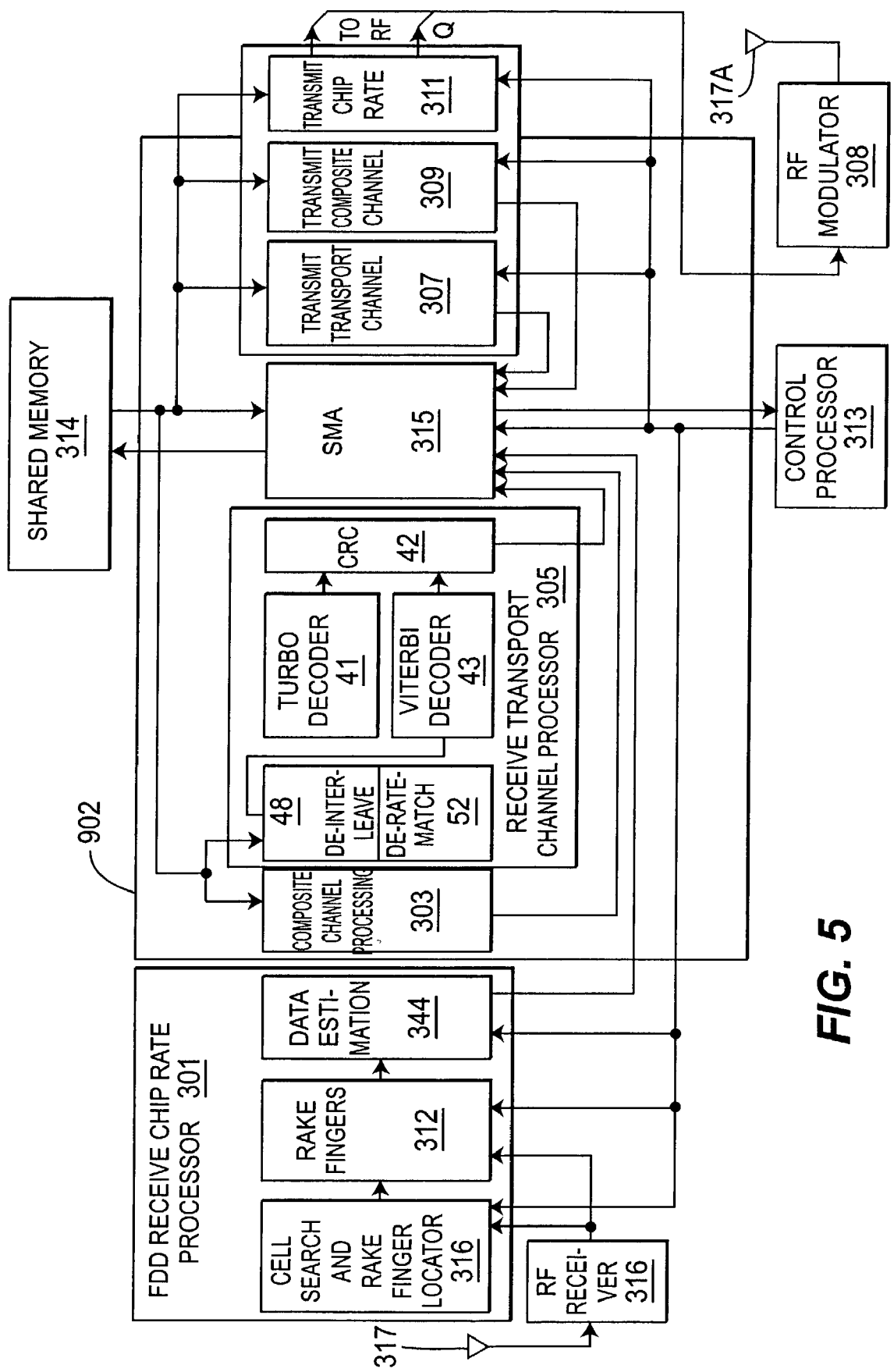
FIG. 5 is a simplified diagram of a FDD user equipment or Node-B/base station.

FIG. 5 is an illustration of control blocks and a linked list scheme using a shared memory access scheme and of the present invention. A hardware register 151 contains the beginning address of a memory control block 155. When parameters and data span over two or more blocks, a linked list mechanism allows for seamless transfers. For example, control block 155 resides in memory as a linked list, its last entry there is a pointer to a second control block 165.

Memory access is provided by the processor 313 or the SMA 315. For example, the hardware register 151 has the beginning address of control block 155, which is loaded with parameters and data. In operation, consecutive memory accesses by the SMA 315 or the processor 315 allow data transfers to and from the composite blocks.

For example, the first set of parameters 154 in control block 155 start at address 0100h. A memory address pointer is first set to 0100h and parameters 154 are transferred. The memory address pointer is incremented to the next memory address, which is 0104h and parameters 157 are transferred. This process is repeated until the memory addressing reaches address 0118h.

At 011Ch the processor 313 or SMA 315 either by initial set up or a by a flag in the data located at 011C8h, and, swaps the memory address pointer with the first address of data block__1 162. The data in data block__1 is then sequentially transferred. Upon completion of the transfer, the memory address pointer is then swapped back and incremented and points to address 0120h of control block 155, which also swaps the memory address pointers to sequentially acquire additional data from data block__2 164.

Upon returning from data block__2 164, the memory address pointer is at 0124h which is the Next_Chain_Address 160. The data located at this address is the first address of to the next control block 165, which also comprises parameters 166 and data block addresses 168-174 pointing to data blocks 176-180, respectively. At the end of this linked list is a flag 174 indicating the end of the link lists.

Figure 10:
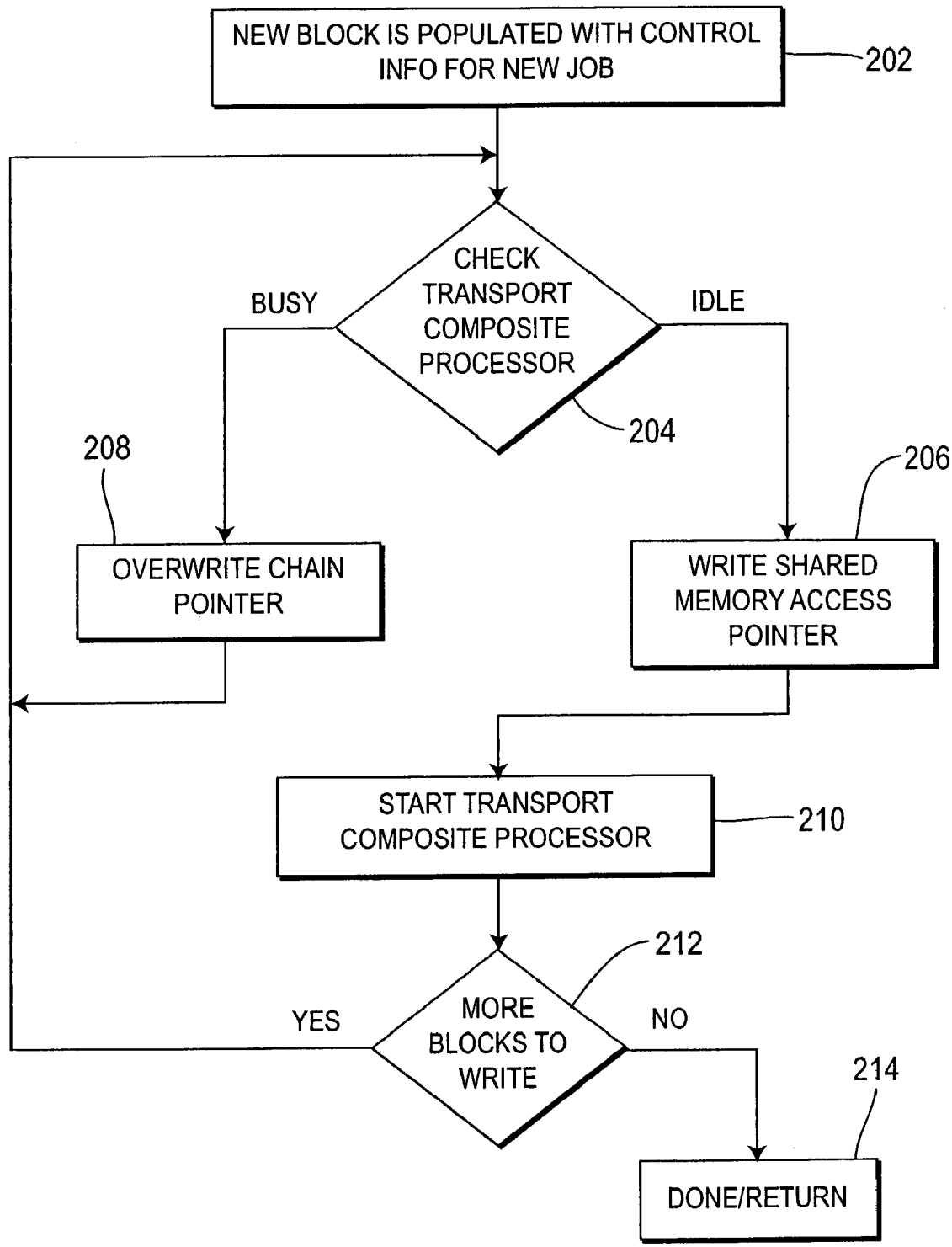
FIG. 10 is a flowchart of the block loading process from the control processor to shared memory.

An illustration of a preferred block loading process from the shared memory 315 is illustrated in FIG. 10. In typical implementations, there are timing issues associated with write accesses to dual port memories. Contentions come about when two or more entities try to access the same memory region, especially when performing a write operation. One possible preferred approach to resolve this problem is to allow control block writes when the composite/transport processor is idle.

As a new block becomes available 202, a check is made to see if the composite/transport processor is idle 204. If the composite/transport processor is busy, the chain pointer is overwritten 208 and the control loops back checking to check the status of the processor. If composite/transport processor is idle, a shared memory access (SMA) pointer is written 206 and the data write is started 210. A check for more control blocks 212 is performed. If there are more control blocks, control loops back to the check processor status 202. If there are more control blocks, the block loading is complete and the system will return 214.

A preferred embodiment for physical layer processing for transmission in TDD mode is described as follows to illustrate the parameterization of the control blocks. To generate transmittable data, the control blocks transmit transport channel processor 307, transmit composite channel processor 309, and transmit chip-rate processor 311 are utilized. First blocks of data are sent to the transmit transport channel processor 307 block from the shared memory 315. Transport blocks are generated and a cyclical redundancy check (CRC) is added at CRC attachment processor 42 to each new transport block. In the preferred implementation, typical CRC types are generated, including none, 8, 12, 16 and 24 bit CRCs.

Table 1 is a list of software parameters which is loaded into transmit transport channel processor 307 block.

TABLE 1

| Control Block Parameters | Comments/Description |
| --- | --- |
| Quality of Service | CRC. Number of CRC bits/4 coding type. 00 = none. 01 = turbo 10 = 1/2 conv. 11 = 1/3 conv. interleave rate. 00 = 10 ms. 01 = 20 ms. 10 = 40 ms. 11 = 80 ms. |
| Mode | NCOL-P (number of columns in the interleaver matrix) 00 = P. 01 = P + 1. 10 = P + 1 and K = C * R. 11 = P − 1. |

TABLE 1-continued

| Control Block Parameters | Comments/Description |
| --- | --- |
| | MAC header pad bits |
| Sequence Number | used to identify each transport channel. |
| Number of Transport Blocks | Number of transport blocks in transport channel. |
| Transport Block Size | Number of bits in last 32-bit input word. 0 means 32. Number of bits per transport block. Rounded up to the next multiple of 32. |
| Coder Input Size | Number of total bits input to the coder minus one. |
| Coder Output Size | Number of total 32-bit words output from the first interleaver. |
| Coding Block Size | Number of bits per coder block. |
| Coding Block Filler Bits | Number of filler bits in the first code block. |
| Turbo Interleaver Control | the Number of rows in the transport channel. Primitive Root. Prime Number. |
| Turbo Interleaver Prime Number Table | Prime Number table for the turbo interleaver (10 words). |
| Interleaver Memory Addresses | Frame destination addresses, 8 addresses regardless of TTI. |
| Transport Block Memory Addresses | Transport block source addresses. One per transport block. |
| Next TrCH Control Block Address/End | Pointer to the control block for the next transport channel (if there are more to process). A NULL (value of 0) pointer with bit 31 set indicates that there are no more transport channels (i.e. a value of 0x80000000 is always used to indicate the last transport channel. |

The TrBlk concatenation/code block segmentation processor 44 creates a transmission time interval's (TTI's) worth of transport blocks, where the number of the blocks depends on the transport format selected for a particular Transmit channel. The segmentation processor 44 also concatenates the blocks into a single entity.

Code blocks for the given transport channel are delivered to the channel coder processor 46. Depending on the coding type for the given transport channel, specified in the input data file, they are delivered to the appropriate channel coder function. Referring to Table 1, bits 10 and 11 are set to the desired type of coding. If the bits are set to 00, there is no coding. If the bits are set to 01, 10 and 11, the coding is Rate ½ convolutional, Rate ⅓ convolutional and Turbo, respectfully. The types of coding which are possible in the preferred embodiment are defined by the 3GPP TSG-RAN "Muliplexing and Channel Coding" 3GPP TS 25.212. This parameterizable hardware based approach allows for coding at a high performance level, for example, one clock per bit for convolutional encoding and two clocks per bit for Turbo Encoding. This is ten to one-hundred times faster (per clock rate) than the same function is typically performed in software.

After channel coding, the coded blocks are processed in sequence by a rate matching process in the radio frame equalization 45 process. This effectively implements a concatenation of encoded blocks. The output is then sent to a first interleaver 50 process. The interleaving depends on the TTI interleaver rate which is also a software parameter in Table 1. For example, a 00 is set into bits 8 and 9 of the Quality of Service register for an interleave of 10 milliseconds. For 20, 40 and 80 ms TTIs, values of 01, 10 and 11, respectively, are set into bits 8 and 9. The data is segmented in the radio frame segmentation process 50 and returned to the shared memory 315 ready for the transmit composite channel processor 309 block.

The transmit composite channel processor 309 block extracts data from the shared memory 315 along with control parameters and produces physical channel data. A radio frame's worth of data is complied from the data output from the previous block's first interleaver for the given transport channel.

Table 2 is a format parameter table of the transmit composite channel processor's 309 control block.

TABLE 2

| TrCH Control Block Parameters | Description |
| --- | --- |
| Number Bits Before Rate Matching This Trch | The Number of bits in the current column (frame) of the First Interleaver Buffer for this TrCH. |
| Number Leftover Bits This Trch | The Number of bits at the tail of the transport channel that are not considered for puncturing or repeating. Used for Turbo puncture, P2 bits. |
| Rate Matching Direction | Indicates whether the bit sequences is {S, P1, P2} (forward) or {P2, P1, S} (reverse) Used for Turbo puncture, P2 bits. |
| Rate Matching Type | Indicates TURBO_PUNCTURE, REPEAT, NON_TURBO_PUNCTURE, or NONE. |
| Rate Matching Column Top | Indicates whether the first bit in the column is a systematic (S), parity 1 (P1), or parity 2 (P2) bit. |
| std_e_init1 | The initial value of the rate matching parameter for the first sequence. |
| std_e_plus1 | The increment value to the error when a bit is punctured or repeated. |
| std_e_minus1 | The decrement value to the error when a bit is read from the First Interleaver Buffer. |
| std_e_init2 | The initial value of the rate matching parameter for the second sequence. Used for Turbo puncture, P2 bits. |
| std_e_plus2 | The increment value to the error when a bit is punctured or repeated. Used for Turbo puncture, P2 bits. |
| std_e_minus2 | The decrement value to the error when a bit is read from the First Interleaver Buffer. Used for Turbo puncture, P2 bits. |
| Start Address This Trch | The starting memory address of the transport channel. |

For example, the rate matching type parameter uses bits 28 and 29. When these bits are set to 00, this indicates TURBO_PUNCTURE mode. Likewise, REPEAT, NON_TURBO_PUNCTURE, and NONE are represented by placing 01, 10 and 11, respectively into bit locations 28 and 29 of the parameter register.

The data is rate matched by rate matching process 52 before it is multiplexed with other channels at the transport channel (TrCH) multiplexing process 54. The output of the multiplex transport channel processor 54 is segmented into physical channels in the physical channel (PyCH) 57 processor. A second interleaving is performed by the second interleaving processor 46 and mapped into physical channels at the physical channel processor 62. The transmit channel processed data is then returned to the shared memory 315 for further processing by the transmit chip-rate processor.

The transmit chip-rate processor 311 block then extracts data and control parameters from the shared memory 315. In the preferred TDD implementation, the block 311 performs spreading, scrambling, gain application, formatting, preamble insertion, RRC filtering and produces one to sixteen resource units per time slot. The I and Q output of the transmit chip-rate processor 311 for transmission.

FIG. 11 illustrates a preferred transmit configuration timeline 500 and show the advantages of the reparamatizable hardware implementation. The frames are bound by Frame Markers 503 on the Message Timeline 502. To transmit a signal at Frame N 409, the data for the transmission must be configured during Frame N−2 505 before the processing is started at Execute_N 510. The data for Frame N is processed during Frame N−1 and must be completely finished processing and ready to transmit by Frame Marker 503(*n*).

At time N−2 505 on the database timeline 504, the frame hardware of the transmit channel is configured. At time N−1 507 the start control signal is sent from the SMA 313 to start the block processing from the database. The processing is performed in the transmit transport channel processor 307 and transmit composite channel processor 309, which make up the transmit frame receive processors. At time N 509, the transmit chip processor 311 is processing the data it received from the database.

To illustrate the flow of data through physical channel processing, FIG. 12 is an illustration of a preferred flow of data for FDD transmission. In FIG. 12, the transport channel is encoded and interleaved by a factor of four into two physical channels. The raw data for transport channel_1 102 and transport channel_2 104 are SMA transferred to the transport channel processing 106 where the CRC is added and the data is segmented into code blocks. The blocks are encoded, rate matched and a first interleaving is performed. The data as blocks of transmit channel data 108-122 are sent to the shared memory. The data is then sent to composite channel processing 124 where it is rate matched, second interleaved and segmented into physical channels at the rate of once per frame. The Physical Channel data is sent to the shared memory ordered as physical channels by frame 126-128. The physical channels by frame data is then sent to the Chip Rate Processing 130 where it is spread scrambled and filtered on a per frame basis. A control channel is also appended to each generated frame.

A series of "jobs" for each channel processor are scheduled by software and presented to the processors via linked list job queues maintained in the shared memory. Each processing unit receives "jobs" via control blocks that reside in the shared memory. The content of each control block is a function of the unit for which it controls. The data and the order of the data is defined by the functionality and the specifications of each unit. Entries in each control block include control parameters for the unit and addresses which point to input data and addresses to output data locations. Control blocks can be linked together reducing control processor overhead.

With respect to the physical layer processing of received signals in TDD mode, a preferred parameters table is shown in Table 3.

TABLE 3

| Name | Description |
| --- | --- |
| il2 Disable | Second Interleaver disable. |
| Descr Disable | Descrambler disable. |
| Number TrCH | Number of TrCH in the CCTrCH. |
| Number Interleaver Blocks | Number of ILBs in the CCTrCH. |
| Interleaver Block Size | Number of bits in this ILB. |
| Number Ts Blocks | Number of time slots in the ILB. |
| Number Full Columns | Number of full columns in the second interleaver matrix. |
| Number Rows | Number of rows in the interleaver array of 30 columns. |
| Ts Block Size | Time slot data block size in bits. |
| Number resource units (RUs) | Number of RUs in the time slot. |
| RU Size | RU data block size (number of soft decisions). |
| RU ConsecutiveSize | Number of consecutive soft bits read from RU. |
| RU Offset | Offset from the start of the first data word of an RU which has data mapped in reverse order. |

TABLE 3-continued

| Name | Description |
| --- | --- |
| RU Address | Start address of the RU data. |
| RU Direction | Data for an RU can be mapped in Forward or Reverse order. |

For example, to disable the second interleaving, bit 16 of the "I2 Disable" would be set to a 1. Control parameters and blocks of data are transferred from the shared memory 315 to the receive composite channel processor 303 block.

FIG. 13 represents the receive configuration timeline 700. The frames are bound by frame markers 703 on the message timeline 702. When a received signal is captured at Frame N 705, the received data is processed during frames Frame N+1 711 and Frame N+2 713. At Frame N+3 the received data is ready for high layer processing.

At time N−1 703, the software parameters for hardware configuration for a particular received frame must be available in the pending database. At time N 709, the receive chip rate processor 301 places the data into the database. At time N+1 711, the received frame processor, which are comprised of the receive composite channel processor 303 and receive transport channel processor 305 process the received data and subsequently sends the data on to higher layers.

What is claimed is:

1. A wireless user equipment configured to operate in both a time division duplex (TDD) and a frequency division duplex (FDD) modes, the user equipment comprising:
   a transmit transport channel processor configured to receive network data for transmission in either a TDD or FDD mode and processing transport channels of the received network data;
   a transmit composite channel processor configured to receive the processed transport channels and produce either resource units when operating in the TDD mode and physical channels when operating in a FDD mode;
   a FDD transmit chip rate processor configured to format the produced physical channels for transfer over a wireless interface; and
   a TDD transmit chip rate processor configured to format the produced resource units for transfer over the wireless interface;
   wherein the FDD transmit chip rate processor and the TDD transmit chip rate processor are each separate processing blocks, wherein the transmit transport channel processor, the transmit composite channel processor, the FDD transmit chip rate processor, the TDD transmit chip rate processor, a FDD receive chip rate processor, a TDD receive chip rate processor, a receive composite channel processor and a receive transport channel processor are couples to a system bus.

2. The wireless user equipment of claim 1 wherein the system bus comprises a common data read bus, data write bus and control bus.

3. The wireless user equipment of claim 1 wherein the transmit transport channel processor is configured to perform CRC attachment, transport block concatenation/code block segmentation, channel coding, radio frame segmentation, first interleaving and radio frame equalization in TDD and FDD modes.

4. The wireless user equipment of claim 1 wherein the transmit composite channel processor is configured to perform rate matching, traffic channel multiplexing, bit scrambling, physical channel segmentation, second interleaving and physical channel mapping in TDD and FDD modes.

5. The wireless user equipment of claim 1 wherein the FFD transmit chip rate processor and the TDD transmit chip processor are configured to perform spreading, scrambling, pulse shape filtering and frequency correction.

6. The wireless user equipment of claim 1 wherein the transmit transport channel processor and the transmit composite channel processor are configured to operate in both FDD and TDD modes and are parameterized by software to operate in a corresponding mode.

7. The wireless user equipment of claim 1 further comprising a radio frequency transmitter configured to transmit the produced resource units and produced physical channels through the wireless interface.

8. A wireless user equipment configured to operate in both a time division duplex (TDD) and a frequency division duplex (FDD) modes, the user equipment comprising:
   a FDD receive chip rate processor configured to format signals received in a FDD format into physical channels;
   a TDD receive chip rate processor configured to format signals received in a TDD format into resource units;
   a receive composite channel processor configured to receive either resource units when operating in TDD mode and physical channels when operating in FDD mode and produce transport channels; and
   a receive transport channel processor configured to process the produced transport channels received when operating in either a TDD or FDD mode and process the received transport channels to produce network data;
   wherein the FDD receive chip rate processor and the TDD receive chip rate processor are each separate processing blocks, wherein the FDD receive chip rate processor, the TDD receive chip rate processor, the receive composite channel processor and the receive transport channel processor are coupled to a system bus.

9. The wireless user equipment of claim 8 wherein the system bus comprises a common data read bus, data write bus and control bus.

10. The wireless user equipment of claim 8 wherein the receive transport channel processor is configured to perform in TDD mode an inverse of CRC attachment, traffic block concatenation/code block segmentation, channel coding, radio frame equalization, first interleaving and radio frame segmentation and in FDD mode an inverse of CRC attachment, traffic block concatenation/code block segmentation, channel coding, rate matching, first discontinuous transmission indication insertion, first interleaving, radio frame segmentation and traffic channel multiplexing.

11. The wireless user equipment of claim 8 wherein the receive composite channel processor is configured to perform in TDD mode an inverse of traffic channel multiplexing, bit scrambling, physical channel segmentation, second interleaving and physical channel mapping and in FDD mode an inverse of second discontinuous transmission indicator insertion, physical channel segmentation, second interleaving and physical channel mapping.

12. The wireless user equipment of claim 8 wherein the FDD receive chip rate processor and the TDD receive chip rate processor are configured to perform an inverse of spreading, scrambling, pulse shape filtering and frequency correction.

13. The wireless user equipment of claim 8 wherein the receive transport channel processor and the receive composite channel processor are configured to operate in both FDD and TDD modes and are parameterized by software to operate in a corresponding mode.

14. The wireless user equipment of claim 8 further comprising a radio frequency receiver configured to receive resource units and physical channels over a wireless interface for input into the receive chip rate processor.

15. A wireless Node-B/base station configured to operate in both a time division duplex (TDD) and a frequency division duplex (FDD) modes, the user equipment comprising:
    a transmit transport channel processor configured to receive network data for transmission in either a TDD or FDD mode and processing transport channels of the received network data;
    a transmit composite channel processor configured to receive the processed transport channels and produce either resource units when operating in the TDD mode and physical channels when operating in a FDD mode;
    a FDD transmit chip rate processor configured to format the produced physical channels for transfer over a wireless interface; and
    a TDD transmit chip rate processor configured to format the produced resource units for transfer over the wireless interface;
    wherein the FDD transmit chip rate processor and the TDD transmit chip rate processor are each separate processing blocks, wherein the transmit transport channel processor, the transmit composite channel processor, the FDD transmit chip rate processor, the TDD transmit chip rate processor, a FDD receive chip rate processor, a TDD receive chip rate processor, a receive composite channel processor and a receive transport channel processor are coupled to a system bus.

16. The wireless Node-B/base station of claim 15 wherein the system bus comprises a common data read bus, data write bus and control bus.

17. The wireless Node-B/base station of claim 15 wherein the transmit transport channel processor is configured to perform in TDD mode CRC attachment, traffic block concatenation/code block segmentation, channel coding, radio frame equalization, first interleaving and radio frame segmentation and in FDD mode CRC attachment, traffic block concatenation/code block segmentation, channel coding, rate matching, first discontinuous transmission indication insertion, first interleaving, radio frame segmentation and traffic channel multiplexing.

18. The wireless Node-B/base station of claim 15 wherein the transmit composite channel processor is configured to perform in TDD mode traffic channel multiplexing, bit scrambling, physical channel segmentation, second interleaving and physical channel mapping and in FDD mode second discontinuous transmission indicator insertion, physical channel segmentation, second interleaving and physical channel mapping.

19. The wireless Node-B/base station of claim 15 wherein the FDD transmit chip rate processor and the TDD transmit chip rate processor is configured to perform spreading, scrambling, pulse shape filtering and frequency correction.

20. The wireless Node-B/base station of claim 15 wherein the transmit transport channel processor and the transmit composite channel processor are configured to operate in both FDD and TDD modes and are parameterized by software to operate in a corresponding mode.

21. The wireless Node-B/base station of claim 15 further comprising a radio frequency transmitter configured to transmit the produced resource units and produced physical channels through the wireless interface.

22. A wireless Node-B/base station configured to operate in both a time division duplex (TDD) and a frequency division duplex (FDD) modes of wideband code division multiple access, the wireless Node-B/base station comprising:
    a FDD receive chip rate processor configured to format signals received in a FDD format into physical channels;
    a TDD receive chip rate processor configured to format signals received in a TDD format into resource units;
    a receive composite channel processor configured to receive either resource units when operating in TDD mode and physical channels when operating in FDD mode and produce transport channels; and
    a receive transport channel processor configured to process the produced transport channels received when operating in either a TDD or FDD mode and process the received transport channels to produce network data;
    wherein the FDD receive chip rate processor and the TDD receive chip rate processor are each separate processing blocks, wherein the FDD receive chip rate processor, the TDD receive chip rate processor, the receive composite channel processor and the receive transport channel processor are coupled to a system bus.

23. The wireless Node-B/base station of claim 22 wherein the system bus comprises a common data read bus, data write bus and control bus.

24. The wireless Node-B/base station of claim 22 wherein the receive transport channel processor is configured to perform an inverse of CRC attachment, transport block concatenation/code block segmentation, channel coding, radio frame segmentation, first interleaving and radio frame equalization in TDD and FDD modes.

25. The wireless Node-B/base station of claim 22 wherein the receive composite channel processor is configured to perform an inverse of rate matching, traffic channel multiplexing, bit scrambling, physical channel segmentation, second interleaving and physical channel mapping in TDD and FDD modes.

26. The wireless Node-B/base station of claim 22 wherein the FDD receive chip rate processor and the TDD receive chip rate processor are configured to perform an inverse of spreading, scrambling, pulse shape filtering and frequency correction.

27. The wireless Node-B/base station of claim 22 wherein the receive transport channel processor and the receive composite channel processor are configured to operate in both FDD and TDD modes and are parameterized by software to operate in a corresponding mode.

28. The wireless Node-B/base station of claim 22 further comprising a radio frequency receiver configured to receive resource units and physical channels over a wireless interface for input into the receive chip rate processor.

29. A method for a wireless user equipment which is configured to operate in both a time division duplex (TDD) and a frequency division duplex (FDD) modes of wideband code division multiple access, the method comprising:
    receiving a plurality of network data for transmission in either a TDD or FDD mode;
    processing a first set of transport channels of the received network data in a transmit transport channel processor;
    receiving the processed first set of transport channels and producing either a first set of resource units when operating in the TDD mode and a first set of physical channels when operating in the FDD mode in a transmit composite channel processor;
    formatting the produced first set of physical channels for transfer in a FDD transmit chip rate processor;
    formatting the produced first set of resource units in a TDD transmit chip rate processor;

transmitting the formatted produced physical channels and resource units over a wireless interface in a radio frequency transmitter;

receiving signals from the wireless interface in a radio frequency receiver;

formatting the received signals received in a FDD format into a second set of physical channels in a FDD receive chip rate processor;

formatting the received signals received in a TDD format into a second set of resource units in a TDD receive chip rate processor, wherein the TDD chip rate processor and the FDD receive chip rate processor are each separate processing blocks;

receiving either the second set of resource units when operating in TDD mode and the second set of physical channels when operating in FDD mode and producing a second set of transport channels in a receive composite channel processor;

processing the produced second set of transport channels received when operating in either a TDD or FDD mode to produce network data in a receive transport channel processor; and coupling a common data read, data write and control bus to the transmit transport channel processor, the transmit composite channel processor, the FDD transmit chip rate processor, the TDD transmit chip rate processor, the FDD receive chip rate processor, the TDD receive chip rate processor, the receive composite channel processor and the receive transport channel processor.

* * * * *

UNITED STATES PATENT AND TRADEMARK OFFICE
CERTIFICATE OF CORRECTION

PATENT NO.        : 7,496,074 B2
APPLICATION NO. : 10/414125
DATED             : February 24, 2009
INVENTOR(S)      : Hepler et al.

It is certified that error appears in the above-identified patent and that said Letters Patent is hereby corrected as shown below:

ON THE TITLE PAGE

Item (56), OTHER PUBLICATIONS, line 1, after the word "Hybrid" delete "TDD/TDD-CDMA" and insert therefor --FDD/TDD-CDMA--.

At column 2, line 36, before the word "better" delete "the n" and insert therefor --results in--.

At column 3, line 44, before the word "leveraged" delete "parametizable" and insert therefor --parameterizable--.

At column 5, line 28, after the words "of these" delete "controls" and insert therefor --control--.

At column 5, line 29, before the words "As a result" delete "parametized" and insert therefor --parameterized--.

At column 5, line 33, before the words "it resides" insert --in which--.

At column 6, line 29, before the words "the energy" delete "collects" and insert therefor --collect--.

At column 7, line 5, before the words "this example" delete "In" and insert therefor --in--.

At column 7, line 8, after the word "about" delete "compled" and insert therefor --completed--.

At column 8, line 24, before the word "configuration" delete "An arriving" and insert therefor --Arriving--.

At column 8, line 30, before the words "the call" delete "form" and insert therefor --from--.

At column 8, line 51, before the words "of the" delete "and".

At column 9, line 5, before the words "by a flag" delete "a".

UNITED STATES PATENT AND TRADEMARK OFFICE
CERTIFICATE OF CORRECTION

PATENT NO. : 7,496,074 B2
APPLICATION NO. : 10/414125
DATED : February 24, 2009
INVENTOR(S) : Hepler et al.

It is certified that error appears in the above-identified patent and that said Letters Patent is hereby corrected as shown below:

At column 9, line 32, before the words "to check" delete "checking".

At column 9, Table 1, line 62, before the word "interleave" insert --:--.

At column 9, Table 1, line 63, before "NCOL – P" insert --:--.

At column 10, Table 1, line 6, before the words "MAC header" insert --:--.

At column 10, Table 1, line 7, before the words "used to" insert --:--.

At column 10, Table 1, line 8, before the word "Number" insert --:--.

At column 10, Table 1, line 9, before the word "Number" insert --:--.

At column 10, Table 1, line 11, before the word "Number" insert --:--.

At column 10, Table 1, line 12, before the word "Number" insert --:--.

At column 10, Table 1, line 14, before the word "Number" insert --:--.

At column 10, Table 1, line 17, before the word "Number" insert --:--.

At column 10, Table 1, line 19, before the words "Primitive Root" insert --:--.

At column 10, Table 1, line 20, before the words "Prime Number" insert --:--.

At column 10, line 46, after the word "Turbo," delete "respectfully" and insert therefor --respectively--.

At column 11, Table 2, line 19, after the words "the bit" delete "sequences" and insert therefor --sequence--.

At column 11, line 62, before the words "for transmission" insert --are sent to an RF Modulator 308--.

At column 11, line 64, before the words "the advantages" delete "show" and insert therefor --shows--.

UNITED STATES PATENT AND TRADEMARK OFFICE
CERTIFICATE OF CORRECTION

PATENT NO. : 7,496,074 B2
APPLICATION NO. : 10/414125
DATED : February 24, 2009
INVENTOR(S) : Hepler et al.

It is certified that error appears in the above-identified patent and that said Letters Patent is hereby corrected as shown below:

At column 11, line 64, after the words "frame data" delete "is" and insert therefor --are--.

At column 12, line 29, after the word "spread" insert --,--.

At column 12, line 30, after the word "spread" insert --,--.

Column 13, line 55, before the words "to a" delete "couples" and insert therefor --coupled--.

Column 14, line 3, after the words "wherein the" delete "FFD" and insert therefor --FDD--.

Signed and Sealed this

Nineteenth Day of May, 2009

JOHN DOLL
*Acting Director of the United States Patent and Trademark Office*